(12) United States Patent
Brown et al.

(10) Patent No.: US 7,093,029 B2
(45) Date of Patent: *Aug. 15, 2006

(54) METHOD AND SYSTEM FOR PROVIDING ACCESSIBILITY TO ELECTRONIC MAIL

(75) Inventors: Frances B. Brown, Austin, TX (US); Susan Crayne, Hartsdale, NY (US); Samuel R. Detweiler, Austin, TX (US); Peter Gustav Fairweather, Yorktown Heights, NY (US); Vicki Lynne Hanson, Chappaqua, NY (US); Richard Scott Schwerdtfeger, Round Rock, TX (US); Beth Rush Tibbitts, Lexington, KY (US)

(73) Assignee: International Business Machines Corporation, Armonk, NY (US)

( * ) Notice: Subject to any disclaimer, the term of this patent is extended or adjusted under 35 U.S.C. 154(b) by 660 days.

This patent is subject to a terminal disclaimer.

(21) Appl. No.: 09/961,920

(22) Filed: Sep. 24, 2001

(65) Prior Publication Data

US 2003/0061288 A1 Mar. 27, 2003

(51) Int. Cl.
*G06F 15/16* (2006.01)
(52) U.S. Cl. .................... 709/246; 709/217; 709/219; 709/227
(58) Field of Classification Search ............... 709/232, 709/217–219, 227, 246
See application file for complete search history.

(56) References Cited

U.S. PATENT DOCUMENTS

| 5,754,737 A | * | 5/1998 | Gipson ..................... 706/11 |
| 5,918,013 A | * | 6/1999 | Mighdoll et al. ........... 709/217 |
| 5,983,273 A |   | 11/1999 | White et al. |
| 5,996,022 A |   | 11/1999 | Krueger et al. |
| 6,038,595 A |   | 3/2000 | Ortony |
| 6,061,718 A | * | 5/2000 | Nelson ..................... 709/206 |
| 6,092,114 A | * | 7/2000 | Shaffer et al. ............. 709/232 |
| 6,101,320 A | * | 8/2000 | Schuetze et al. ........... 709/206 |
| 6,138,150 A |   | 10/2000 | Nichols et al. |
| 6,247,048 B1 | * | 6/2001 | Greer et al. ............... 709/219 |
| 6,247,050 B1 | * | 6/2001 | Tso et al. .................. 709/224 |
| 6,311,215 B1 | * | 10/2001 | Bakshi et al. .............. 709/221 |

(Continued)

OTHER PUBLICATIONS

Freire, Juliana; WebViews: Accessing Personalized Web Content and Services, ACM, pp. 576-586.*

*Primary Examiner*—Bunjob Jaroenchonwanit
*Assistant Examiner*—Ramsey Refai
(74) *Attorney, Agent, or Firm*—Robert M. Carwell; Dillon & Yudell LLP

(57) ABSTRACT

A method and system that provide an accessibility gateway to Internet e-mail through the use of a web intermediary server. The web intermediary server preferably includes server-generated applications for modifying accessibility settings for supported client devices, registering the user for authority to use the intermediary server services, and generating mail web pages capable of allowing access and use of the Internet mail server. A request for e-mail from any mail server is sent from the client device to the intermediary server. The intermediary server retrieves the requested e-mail from a mail server, transcodes the server-based e-mail into a web-based e-mail, and applies user-defined transformations to the e-mail for accessibility, which is then sent back to the client device. If the e-mail is from a secure mail server, the intermediary server functions as a proxy for the user device to establish the requisite secure connection with the mail server.

7 Claims, 4 Drawing Sheets

U.S. PATENT DOCUMENTS 6,345,300 B1 * 2/2002 Bakshi et al. ............... 709/229
6,421,733 B1 * 7/2002 Tso et al. ................... 709/246
6,463,134 B1 * 10/2002 Okada et al. ............ 379/93.24
6,611,358 B1 * 8/2003 Narayanaswamy ......... 358/442
6,662,218 B1 * 12/2003 Mighdoll et al. .......... 709/219
6,880,014 B1 * 4/2005 Brown et al. ............... 709/227

* cited by examiner

METHOD AND SYSTEM FOR PROVIDING ACCESSIBILITY TO ELECTRONIC MAIL

CROSS-REFERENCE TO RELATED APPLICATIONS

The present application is related to the following copending application, which is filed on even date herewith and incorporated herein by reference: U.S. patent application Ser. No. 09/962,000.

BACKGROUND OF THE INVENTION

1. Technical Field

The present invention relates in general to the field of computer networks, and, in particular, to the connection between a user device and a content server. Still more particularly, the present invention relates to an improved method and system for providing accessibility to electronic mail.

2. Description of the Related Art

The Internet comprises a vast network of heterogenous computers and sub-networks all communicating together to allow for global exchange of information. The World Wide Web (WWW) is one of the more popular information services on the Internet. The WWW uses browser software to decipher HyperText links to other documents or files located on remote computers, all of which are connected to the Internet. Browsers provide a user-friendly interface that allows users to easily navigate from site to site or file to file around the Internet. Using a browser, a user can access information in the form of text, audio, video, still pictures and related multimedia stored on remote computers or content servers. In addition, the Internet provides transmission of messages called electronic mail, better known as "e-mail," service to its users. While some e-mail systems are confined to a single computer system or network, such as a business' intranet, the most popular form of e-mail is through the Internet. Through the use of gateways to other computer systems, the Internet allows users to send and receive electronic mail anywhere in the world.

E-mail servers are found in a variety of servers and services connected to the Internet. The most common e-mail servers are associated with online services that provide their subscribers with a wide variety of data transmitted over telecommunication lines, and Internet Service Providers (ISP), which provide access to the Internet.

FIG. 1 is a simplified block diagram of the prior art used to access server-based Internet e-mail. A client device 10, such as a desktop computer, laptop computer, personal digital assistant (PDA), onboard vehicle computer, cellular telephone, etc., invokes its resident e-mail client application 12 to send a request for e-mail, typically through an ISP, to an Internet mail server 30. Internet mail server 30 will typically have separate servers for sending and receiving e-mail. Usually, client device 10 receives e-mail from a server using Post Office Protocol (POP) or Internet Message Access Protocol (IMAP), and client device 10 sends e-mail to a server using Simple Mail Transfer Protocol (SMTP).

A significant limitation of Internet-based e-mail relates to providing accessibility to handicapped users, including the visually impaired, hearing impaired and physically handicapped. Such accessibility primarily consists of changing the style of the e-mail received, such as changing print font sizes or converting written text to aural speech for the visually impaired. Accessibility features also relate to modifying how information is input into the user's device (such as a computer), to include changing the time delay for auto-repeat functions on a keyboard for users unable to quickly strike keys, changing mouse roller ball sensitivity and other changes to input devices to accommodate physical limitations of the user. Internet accessibility programs have historically been limited to a particular application program or operating system for the client device being used by the handicapped user.

The problem of transcoding for accessibility is complicated if the user of client device 10 sends a request to a secure server. Secure connections in the prior art between a secure Internet mail server 30 and client device 10 establish the requirement that the connection be inaccessible to any third party. A secure Internet mail server 30 supports any of the major security protocols that encrypt and decrypt messages to protect them against third-party tampering. A typical protocol for a secure connection is the Secure Sockets Layer (SSL) protocol, which uses a public key, typically a code table, to decipher any coded data. It is understood that the socket of an SSL is typically a software object, not a physical component of a computer system. Thus, accessibility transcoding of content from secure web pages can only be accomplished if the transcoder can communicate between client device 10 and secure Internet mail server 30.

It should therefore be apparent that there exists a need for a universal accessibility system for a handicapped user to access e-mail from any selected mail server 30, secure or non-secure. Such a system should include a user-specific and user-defined transcoding system that includes transcoding operations to provide accessibility to that client user, such as font modification, background displays, etc., that can be delivered to a variety of client devices 10 used by that user. It would further be desirable to devise a computer program product wherein such a method may be performed on a computer system. In addition, it would be desirable to devise a proxy machine having the ability to transcode responses from an Internet mail server 30 to a client device 10 according to user-defined preferences for accessibility.

SUMMARY OF THE INVENTION

The present invention in its preferred embodiment is a method and system that provide an accessibility gateway to any Internet mail server through the use of a web intermediary server that generates accessible web-based mail. The web intermediary server preferably includes server-generated applications for modifying accessibility settings for supported client devices, registering the user for authority to use the intermediary server services, and generating mail web pages capable of allowing access and use of the Internet mail server. A request is sent from the client device to the intermediary server for e-mail content provided in any Internet e-mail server. The intermediary server retrieves the requested e-mail from a mail server, transcodes the server-based e-mail into a web-based e-mail, and applies user-defined transformations to the e-mail for accessibility, which is then sent back to the client device. If the e-mail is from a secure mail server, the intermediary server functions as a proxy for the user device to establish the requisite secure connection with the mail server. The above, as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
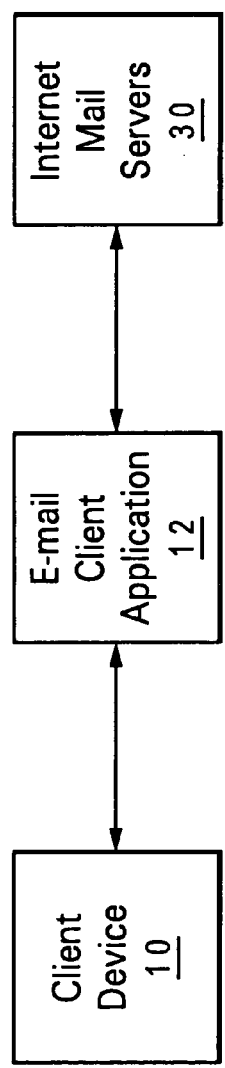
FIG. 1 depicts a block diagram of prior art Internet connections to an electronic mail server.
Figure 2:
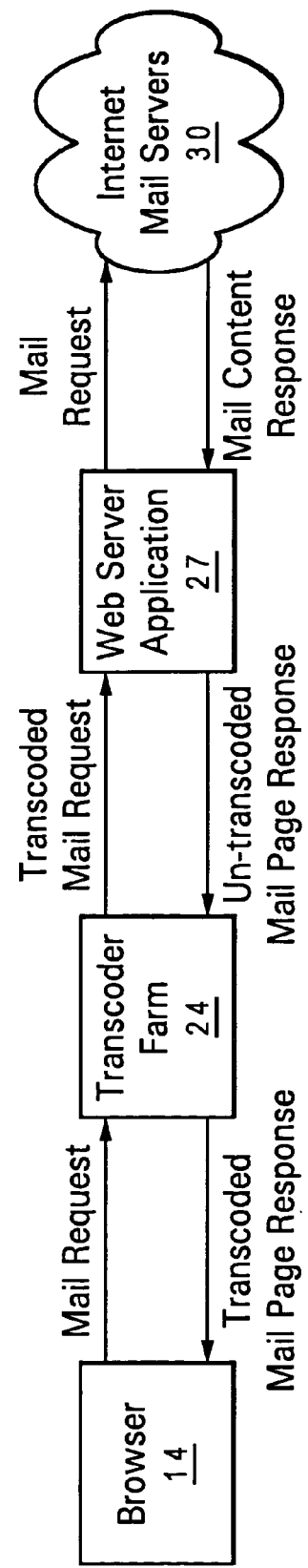
FIG. 2 illustrates a block diagram of an Internet connection using an intermediary server using a transcoder farm and web server application for accessing an Internet mail server.

With reference now to FIG. 2, there is a simplified block diagram of a system for making a connection from a client device 10 to Internet mail servers 30. Associated with client device 10 is browser 14, which sends a request for e-mail. The request is sent through transcoder farm 24, where it is transcoded if necessary. This transcoding may be either for user accessibility and/or device type. One example of user accessibility would be for a user with a physical disability that creates unwanted multiple key strikes, such as a user with palsy or one who cannot release the key before the auto-repeat function initiates. Transcoder farm 24 will recognize this type of error based on the user's profile, and make the appropriate content correction for the input request. An example of device type transcoding could be transforming the content from a device such as a Personal Digital Assistant (PDA) or similar wireless device using Wireless Access Protocol (WAP). The WAP would need to be transcoded into a request format understandable by Internet mail server 30, such as SMTP.

The mail request is routed through web server application 27, which is in a mail application web server that may be in proxy machine 11 containing transcoder farm 24, or the mail application web server may be in a separate connected machine. Web server application 27, preferably an application within intermediary web applications 28 in proxy machine 11 as described below, communicates with Internet mail servers 30 to access e-mail content for user. Web server application 27 also creates a desired mail web page, which preferably includes an inbox, mail folder, attachment command button, send command button as well as mail document itself. User activates commands on mail web page to request e-mail content data, typically in POP3 or IMAP format, from Internet mail servers 30, which return the mail content response to web server application 27. Web server application 27 then sends the web mail page (web based mail) to transcoder farm 24, where it is transcoded if necessary for the specific user's access and/or device type. For example, the mail page may be transcoded for a user having limited vision into an accessible format such as a larger font, different color or background, etc. Further, the mail page may be transcoded into a protocol understood by the specific type of client device 10, such as a PDA or cellular phone.

Figure 3:
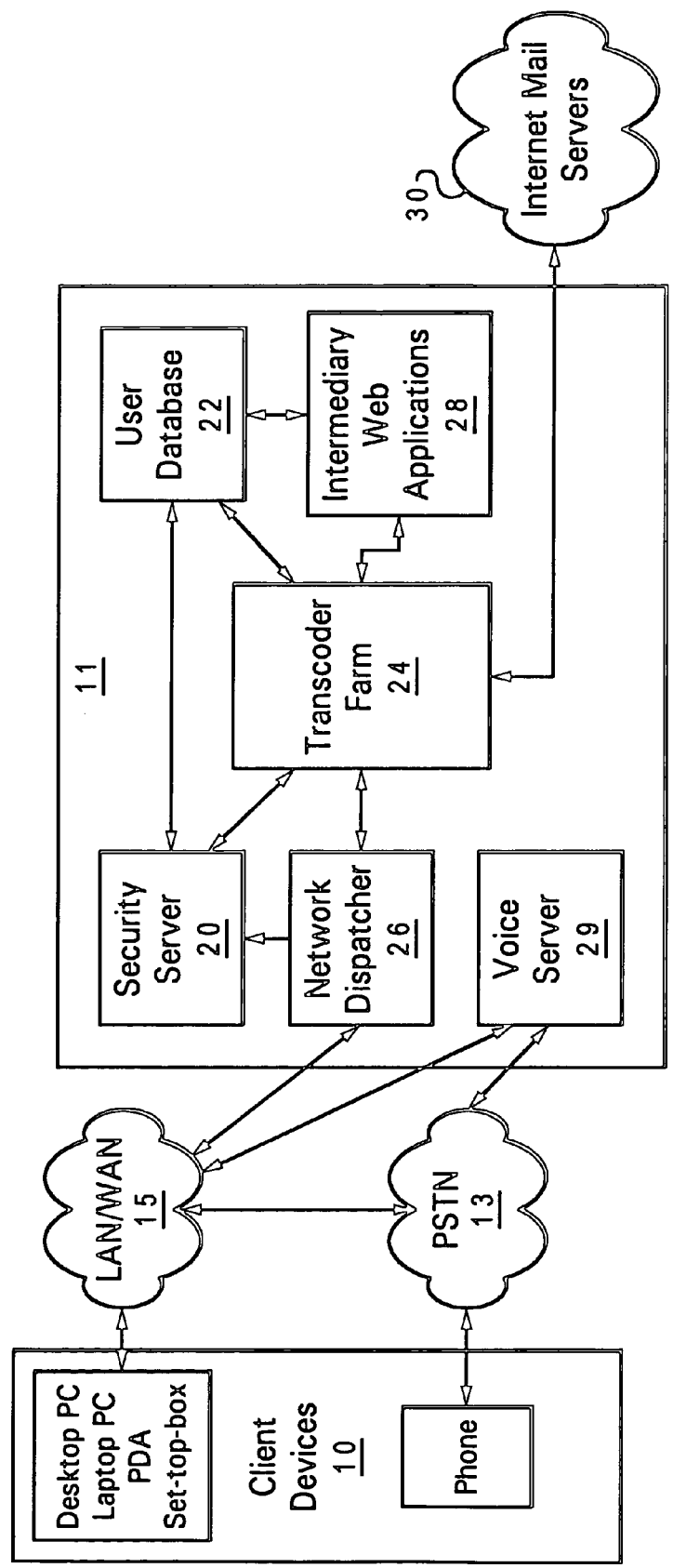
FIG. 3 depicts a block diagram of an Internet connection using a preferred intermediary server for transcoding e-mail requests and content responses.

With reference now to FIG. 3, there is depicted a block diagram of the preferred Internet connection between client device 10 and Internet mail servers 30. Client device 10 may be a network connected device connected through a Local Area Network (LAN) or Wide Area Network (WAN), which LAN/WAN 15 connects directly to proxy machine 11. Such devices may be a desktop computer, laptop computer, set top box, PDA, or computer kiosk. In addition, client device 10 may be a cellular telephone, which typically is connected through a Public Switched Telephone Network PSTN 13 that connects the cellular telephone to proxy machine 11, either directly or via LAN/WAN 15.

As shown in FIG. 3, in the preferred embodiment proxy machine 11 performs several functions. Proxy machine 11 connects client device 10, as described above, to Internet servers 30, which may be an Internet service (ISP), Internet Content Provider (ICP), or other similar gate way devices. Proxy machine 11, which in a preferred embodiment is in a different domain of computers from Internet mail server 30, acts as a proxy between client device 10 and Internet mail server 30. Access to proxy machine 11 may be through a direct or network connection, and may be staged using different communication medium. For example, a telephone may first require transmission through PSTN 13 to a voice server 29. Requests entering proxy machine 11 are routed, for load balancing, through network dispatcher 26. After routing has been determined, the requests are passed to one or more designated transcoders in a transcoder farm 24. User identification information is passed in the request and authenticated by a security server 20 based on the stored user set of protocol. If the user is not known or invalid, proxy machine 11 will direct the client device's user agent (browser) to authenticate the user by prompting it for a user I.D. and password. The authentication information is then be passed to proxy machine 11.

Once a user has been validated, the designated transcoder will query the user data base 22 for profile information. In the preferred embodiment, this profile information is delivered through an eXtensible Markup Language (XML) transcoding directive, which provides directives to the transcoder showing the user's preferred transcoding order, format, etc. The designated transcoder will then retrieve the document from Internet mail server 30, apply the transformation and send it back to client device 10. The transcoding software in proxy machine 11 is designed to handle dynamic transcoding. To do this, each transcoder stores the document retrieved in browser form for manipulation by each of the desired transformations. As a browser, proxy machine 11 works to separate content, data, and executable script for manipulation by the transcoder in transcoder farm 24. This manipulation is designed to improve the accessibility and usability by the disabled or senior user accessing proxy machine 11. The transcoder functions, which are based on the internal browser engine of client device 10, may provide low vision/cognitive transforms, blind transforms, or other transforms.

Other transcoder functions include support for secure connections. Intermediary serve 11 may establish a secure socket connection, preferably in the method and system described in U.S. patent application Ser. No. 09/962,000, to Internet mail servers 30, and this secure connection may be accessed from client device 10 through a secure or non-secure connection, depending on user preference and set up of proxy machine 11. In addition, transcoder fractions may provide access to intermediary web applications 28, which may generate a mail web page having functions such as "Mail Inbox," "Mail Message," "New Message" prompt, and "Send Mail" process block.

User data base 22 functions primarily to provide user profiles specific for a client. User profiles show client preferences for accessibility display of content, and these profiles are typically conveyed to the transcoder in transcoder farm 24 through an XML transcode directive. These same user profiles may be passed through intermediary web applications 28, which are then transcoded in transcoder farm 24 according to the user profile.

Still referring to FIG. 3, after a request has been sent from client device 10 to proxy machine 11, the request is sent to Internet mail server 30 after the client has been authenticated as an authorized user of proxy machine 11. The e-mail is then returned from Internet mail server 30, typically in POP3 or IMAP protocol, where it is transcoded in transcoder farm 24 according to a user profile found in user data base 22. The transcoding then applies the appropriate transform, to include those described above for low vision/cognitive disabilities, blindness, and others.

While transforms have been described above in examples transforming content from Internet mail servers 30 back to client device 10, transforms may also be accomplished going from client device 10 to Internet mail server 30. For example, when the user of client device 10 types an e-mail message to be sent to Internet mail server 30, that user may have a physical disability such as palsy, wherein specific typewriter keys are inadvertently repeatedly struck. The user profile in user data base 22, having this information, can direct a transcoder in transcoder farm 24 to automatically correct such double strikes, typically through a combination of timing criteria and logical autocorrection algorithms. In addition, transcoder farm 24 may transcode input from client device 10 from a protocol used by client device 10, such as WAP if client device is a wireless telephone or similar device, into a protocol understood by Internet mail server 30.

By having a user profile stored in proxy machine 11 that is unique for a user, the user is then able to utilize a variety of client devices 10, by all having access to the user's profile in user data base 22. For example, if the user needs to have image magnified, background removed, and a different display color on a desktop computer, the same user preferences would be automatically applied to any computer used by that user when going through proxy machine 11. Thus the user's own laptop, a borrowed desktop, or a public computer terminal would all display content from any Web site in the same format as defined by that user.

Figure 4A:
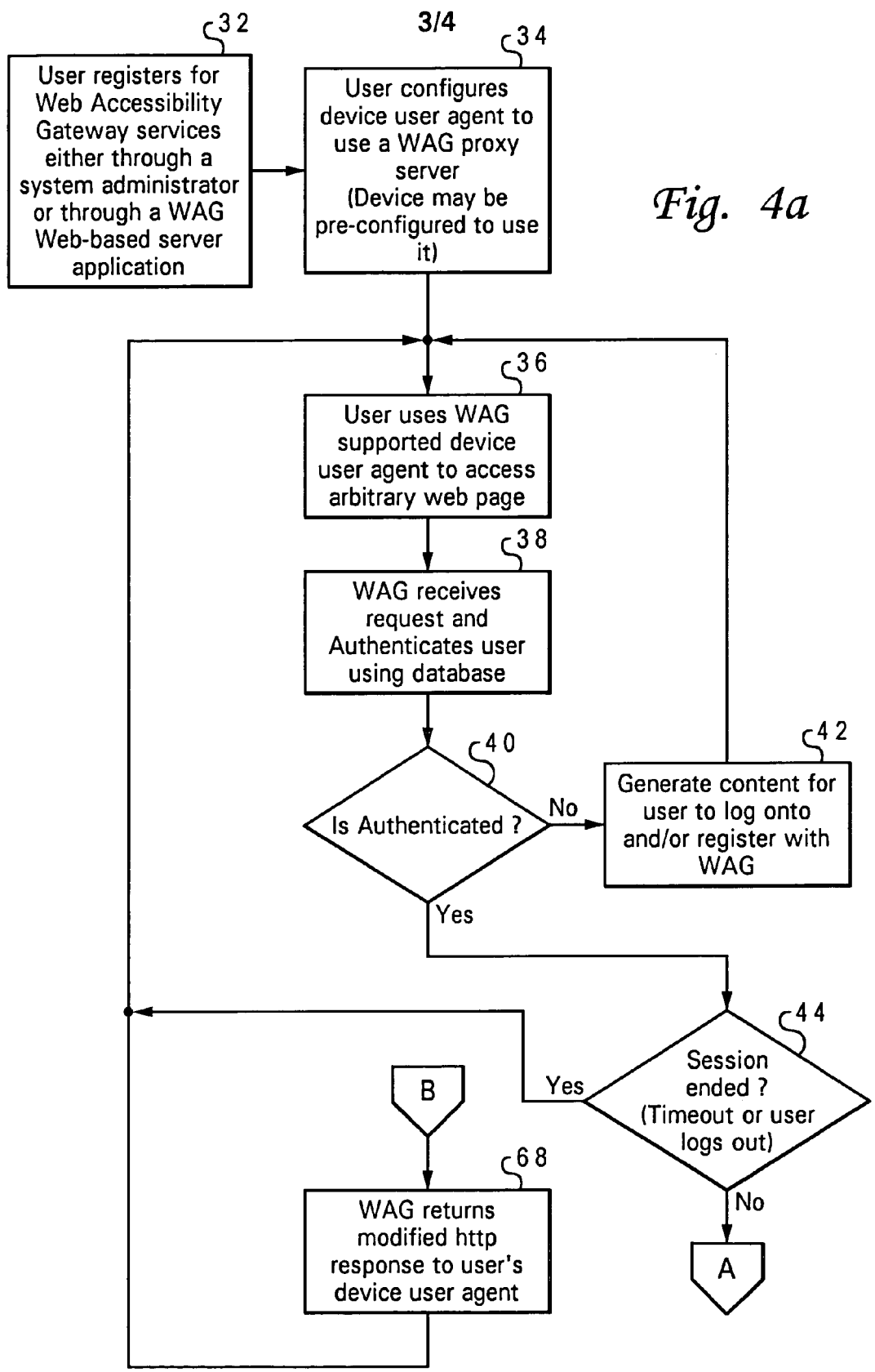
FIGS. 4a and 4b illustrate a high-level flow chart of a method of providing access to e-mail in accordance with a preferred embodiment of the invention.
Figure 4B:
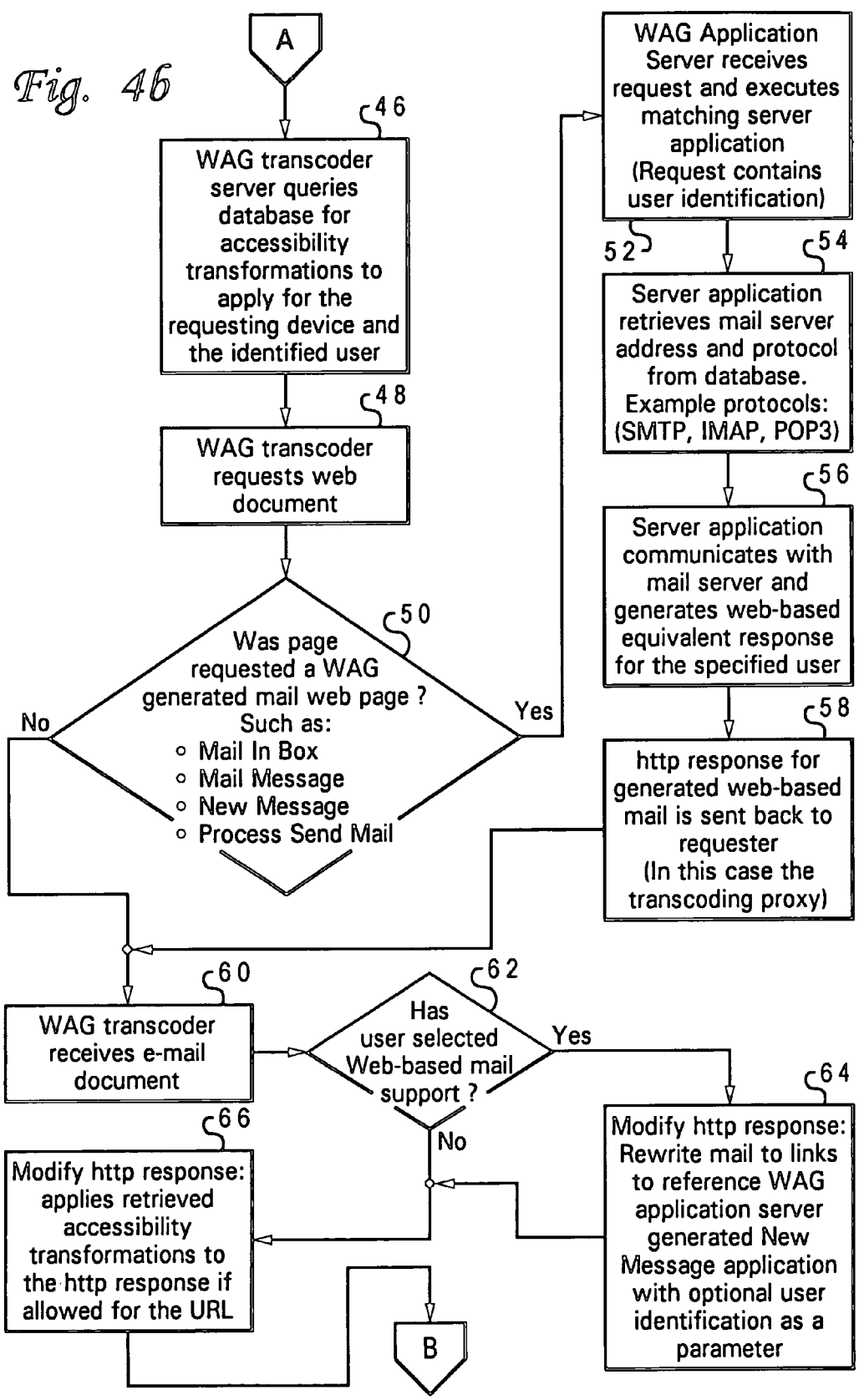

Reference is now made to FIGS. 4a and 4b, a high-level flowchart describing a preferred embodiment of the present invention for accessing e-mail. As depicted in block 32, the user of client device 10 registers for the Web Accessibility Gateway (WAG) services offered through proxy machine 11 either through a system administrator or through a WAG Web-based server application, typically a web page generator with active fields for receiving user enrollment information. In the preferred embodiment, the WAG services comprise a web application server generating applications for modifying user settings for supported devices, registering users, and generating web-based mail from a user's specified mail receive and send severs such as POP3 and IMAP based servers for storing received mail and SMTP based servers for sending mail. The WAG also preferably contains a database in user database 22 containing information regarding how to modify the Web-based e-mail based on the user identification, the type of client device 10 being used, any transformation settings, and the user's selection of web-based mail services to apply web-based accessibility transformations through transcoding or retrieved e-mail. The WAG may also include a database containing a listing of the user's mail servers as well as security services for authenticating users and maintaining privacy. The WAG also contains one or more transcoders in transcoder farm 24 that act as intermediaries for modifying e-mails requested for the purpose of making the e-mail accessible to one or more users and across one or more devices.

Client device 10 is configured, either by an automatic setting service or manually by the user, to use proxy machine 11 as a WAG proxy server, as depicted in block 34. Using proxy machine 11 as a WAG proxy server, the user accesses any web e-mail on the Internet, as illustrated in block 36. The WAG proxy machine 11 receives the request for a web-based e-mail and authenticates the user as being authorized to use the service provided by proxy machine 11, as illustrated in block 38. A query, as described in block 40, is made as to whether the user is authenticated. If not, a directive, as illustrated in block 42, is sent back to client device 10, typically in the form of a web page, requesting content for the user to log onto and/or register with the WAG services offered through proxy machine 11.

When the user is authenticated, a query is made as to whether the session is ended, either because of the expiration of a pre-set amount of time or at the user's direction, as shown in block 44. Referring now to FIG. 4b, if the session is still has not ended, a server for the WAG transcoder farm 24 queries user database 22 for accessibility transforms to be applied for the requested device and the identified user, as shown in block 46. These transforms may include low vision/cognitive transforms designed to allow a person with limited vision to view the content. Transmissive corrections may be applied to modify the style sheet of the Web site, such as changing color or background. Text may be magnified. Increased white space may be applied between letters to aid in those with cognitive disorders. The image may be magnified, sharpened, increased in contrast, and/or have animation removed. The page may be simplified, removing background art work, header displays, etc. Blind transforms may page inject a weblet to transform written text into computer-generated speech.

As depicted in block 48, the WAG transcoder in proxy machine 11 requests the e-mail web document. A query, as illustrated in block 50, is made asking if the page requested is a WAG generated mail web page, such as a Mail In Box, Mail Message, New Message or Send Mail directive block. These web pages are generated by applications functionally associated with proxy machine 11, and generate mail web pages that provide functions typically associated with e-mail servers. If the request is for a proxy machine 11 generated mail web page, an application server associated with the WAG proxy machine 11 receives the request for the mail web page, and executes a matching server application for retrieving the e-mail from Internet mail server 30, as illustrated in block 52. The WAG server application retrieves the address and protocol for mail server 30 from user database 22, as depicted in block 54. The server application in the WAG then communicates with mail servers 30 and generates web-based equivalent responses for the specified user, as shown in block 56. As described in block 58, the web-based equivalent response is then sent to transcoder farm 24 for processing the e-mail before being sent back to client device 10.

Transcoder farm 24 then receives the e-mail document, as illustrated in bock 60. A query, as shown in block 62, is made asking if the user has selected Web-based mail support functions such as Mail Inbox described above in block 50. If so, the e-mail response is rewritten such that "mail to" links reference the WAG application server to invoke the "New Message" application, as illustrated in block 64.

s illustrated in block 66, accessibility transformation transcodings are applied to the e-mail response, using transcoders in transcoder farm 24, preferably under the direction of directives from user database 22 showing the preferred transcodings, such as changing font size, background color, etc. The transcoded response is then returned to the user agent associated with user device 10, as depicted in block 68.

As described in the foregoing description, it is apparent that the present invention provides a significant improvement to disabled users in accessing e-mail. By having function buttons and content that are accessible to the user on any type of client device 10, the disabled user is able to access his e-mail from any e-mail server 30 from any location in a format that both the user and client device 10 can recognize.

It is understood that the present invention also includes the business method of providing a service for delivering the described invention, including a service-provided proxy machine 11 and any other necessary service-provided servers and proxy machines for delivering the described webmail application and transcoding application.

It is understood and appreciated that instructions from a content provider directing that the content provided is not to be transcoded or similarly manipulated should be honored. For example, a "no-transform directive" in an HTTP header or similar instructions should be followed, and the content not transcoded or similarly manipulated according to the instructions of the content provider. A description that is illustrative of such an instruction is found in Section 14.9.5 of the 1999 Network Working Group's HyperText Transfer Protocol HTTP/1.1.

While the invention has been particularly shown and described with reference to a preferred embodiment, it will be understood by those skilled in the art that various changes in form and detail may be made therein without departing from the spirit and scope of the invention.

What is claimed is:

1. A method of doing business for manipulating information retrieved from a content server on a computer network, said method comprising:

connecting an intermediary machine between a user device and a web content server; receiving information from the web content server at the intermediary machine, said intermediary machine having access to a plurality of transcoders and a directive script database;

transcoding in the intermediary—machine the received information from—the web content server into a transcoded response by at least one of the plurality of transcoders according to at least one directive script from the directive script database, wherein said at least one directive script selectively defines at least one transcoding property of at least one transcoder within the plurality of transcoders;

directing, according to the at least one directive script, which of said at least one transcoder are to be run;

directing, according to the at least one directive script, what order said at least one transcoder are to be run;

sending the transcoded response to the user device;

providing a service for storing in the intermediary machine a specific user's profile for a specific user of the user device;

providing a service for receiving at the intermediary machine an electronic mail from the specific user of the user device;

providing a service for identifying the specific user and associating the specific user with the specific user's profile ire the intermediary machine;

providing a service for recognizing a data input error ins the received electronic mail received by the intermediary machine; and providing a service for correcting in the intermediary machine the data input error in the received electronic mail according to instructions from a corrective program called in response to the identifying of the specific user and the specific user's profile.

2. The method of claim 1, further comprising providing a service for transcoding a mail web page into a different format understood by the user device.

3. The method of claim 1, wherein the intermediary machine and the web content server are connected by a secure connection.

4. The method of claim 1, further comprising:

providing a service for registering in a database in the intermediary machine the specific user; and providing a service for allowing only the registered specific user to benefit from a use of the corrective program for correcting data input errors.

5. The method of claim 1, further comprising:

providing a service for sending a corrected received electronic mail to a network based electronic mail server.

6. The method of claim 1, wherein the computer network is an Internet.

7. The method of claim 1, wherein the web content server is a mail application web server that is service-provided.

* * * * *